(12) United States Patent
Dorlac et al.

(10) Patent No.: US 6,500,232 B2
(45) Date of Patent: Dec. 31, 2002

(54) INTERFACIAL CRUD REMOVAL SYSTEM FOR SOLVENT EXTRACTION AND METHOD FOR SOLVENT EXTRACTION

(75) Inventors: Jerome P. Dorlac; R. Brantly Sudderth, both of Tucson, AZ (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/908,200

(22) Filed: Jul. 18, 2001

(65) Prior Publication Data

US 2002/0020252 A1 Feb. 21, 2002

Related U.S. Application Data

(60) Provisional application No. 60/224,130, filed on Aug. 10, 2000.

(51) Int. Cl.[7] .............................................. B01D 11/04
(52) U.S. Cl. ...................... 75/743; 210/511; 210/525; 210/634; 210/803; 266/101
(58) Field of Search ............... 75/743; 210/511, 210/525, 634, 803; 266/101

(56) References Cited

U.S. PATENT DOCUMENTS

| | | | | |
|---|---|---|---|---|
| 3,400,871 A | * | 9/1968 | Davis | 266/101 |
| 3,984,331 A | | 10/1976 | Paige | |
| 3,989,467 A | | 11/1976 | Paige | |
| 4,126,551 A | * | 11/1978 | Cognevich | 210/525 |
| 4,391,711 A | | 7/1983 | Jackson et al. | |
| 4,419,338 A | | 12/1983 | De Schepper et al. | |
| 5,662,871 A | | 9/1997 | Nyman et al. | |

OTHER PUBLICATIONS

Jenkins, et al., "Utilization of Surfactants to Separate Solids From Organic in SX"Reagents for Better Metallurgy, Society for Mining, Metallurgy and Exploration, Inc., Chapter 36, (1994), pp. 349–357.

Ritcey, "Crud in Solvent Extraction Processing –A Review of Causes and Treatment"Hydrometallurgy, vol. 5, Elsevier Scientific Publishing Co., Amsterdam, (1980), pp. 97–107.

Kordosky, "Copper Solvent Extraction: The State of the Art", The Journal of the Minerals, Metals & Materials Society, vol. 44, No. 5, (May, 1992), pp. 40–45.

Virnig, et al., "Crud Formation: Field Studies and Fundamental Studies", Hydrometallurgy of Copper, vol. IV, The Minerals, Metals & Materials Society, (1999), pp. 291–304.

Kordosky, et al., "Pilot Plant Studies on The Relationship Between Copper Solvent Extraction Reagents and Crud Formation", Society For Mining, Metallurgy, and Exploration, Inc., (Paper presented at SME Annual Meeting, Phoenix, Arizona, Mar. 11–14, 1996), pp. 1–5.

* cited by examiner

Primary Examiner—Melvyn Andrews
(74) Attorney, Agent, or Firm—John E. Drach; Henry E. Millson, Jr.

(57) ABSTRACT

Process and equipment for the removal of crud from the interface between aqueous and organic layers in SX settlers in which at least one rotatable auger is positioned at or near the interface to remove crud continuously or intermittently from the interface.

16 Claims, 8 Drawing Sheets

INTERFACIAL CRUD REMOVAL SYSTEM FOR SOLVENT EXTRACTION AND METHOD FOR SOLVENT EXTRACTION

CROSS-REFERENCE TO RELATED APPLICATIONS

This application claims the benefit of copending provisional application serial No. 60/224,130, filed on Aug. 10, 2000, the entire contents of which are incorporated herein by reference.

FIELD OF THE INVENTION

This invention relates to equipment and methods for the removal of crud formed at the interface between aqueous and organic phases in solvent extraction processes for the recovery of metal from metal ores.

BACKGROUND OF THE INVENTION

A major problem in solvent extraction plants used for the solvent extraction of metal values from aqueous solutions obtained from the leaching of metal ores is the formation of interfacial sludge, commonly referred to as gunk or crud. Excess crud formation can lead to a number of problems, requiring the regular removal of the crud from the settling tanks. Known methods for the removal of crud are almost all labor intensive, i. e. involve the physical removal of the crud by an operator.

Since the crud is at least about 50% organic, it is economically important to recover most if not all of the entrained organic phase.

The present invention relates to novel methods and equipment that function effectively to remove the crud without the need for constant operator monitoring.

SUMMARY OF THE INVENTION

The process of the invention is carried out by means of at least one rotating auger (conveyor screw) positioned at the interface between the aqueous and organic phases in an SX settler used in the solvent extraction process for recovering metal from metal ores, e.g. copper ores, nickel ores, zinc ores, uranium ores, etc. The rotating auger(s) are run continuously or intermittently at timed intervals to remove crud from the liquids interface. The SX settlers are sometimes referred to as mixer-settlers.

DESCRIPTION OF THE PREFERRED EMBODIMENTS

Other than in the operating examples, or where otherwise indicated, any numbers expressing quantities of ingredients or reaction conditions used herein are to be understood as modified in all instances by the term "about".

The term "crud" or "gunk" as may be used herein is understood to mean interfacial sludge, which is a solid stabilized emulsion layer at the interface of the aqueous and organic layers comprising from about 50 to about 60% organic solvent containing fine particulate matter. The interfacial sludge can range from a thick jelly-like consistency to a solid. The fine particulate matter can include alpha-quartz, micas, clays, jarosites, gypsum, and often varieties of bacteria such as penicillin and actinomyces.

The crud is formed by the mixing of an organic phase with an aqueous phase containing solids. The solids enter the SX circuit by four primary methods, i.e. by suspension in the pregnant leach solution, by post-precipitation after entering the SX circuit by changes in the pH and/or air entrainment, by airborne dust and debris, and by bacterial growth. One particular source of excessive crud formation is caused by storms, the runoff from which carries fine dirt into the aqueous ponds used as the source of the aqueous phase in the solvent extraction process. The present invention can successfully handle even this problem.

The process and equipment used in the practice of the invention will now be described in conjunction with the drawings.

Figure 1A:
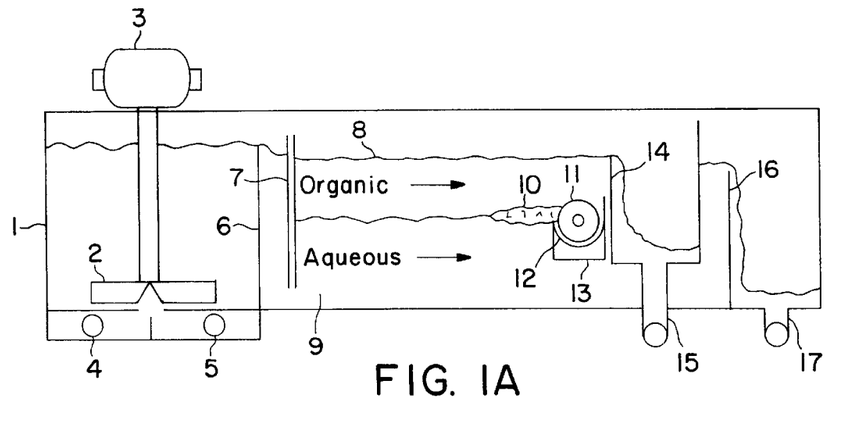
FIG. 1 shows a side view and a top view of a mixer-settler containing a conveyor screw in accordance with the invention.
Figure 1B:
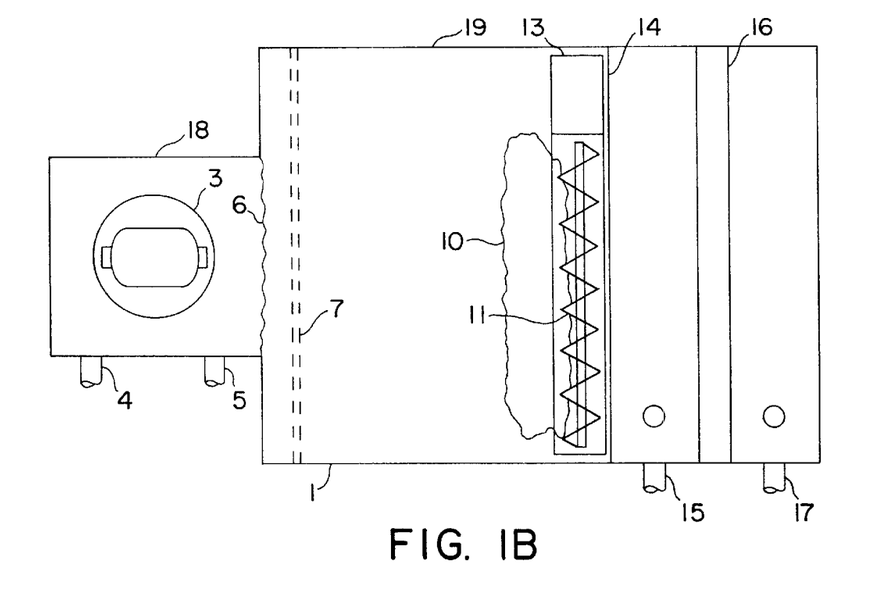
Figure 2A:
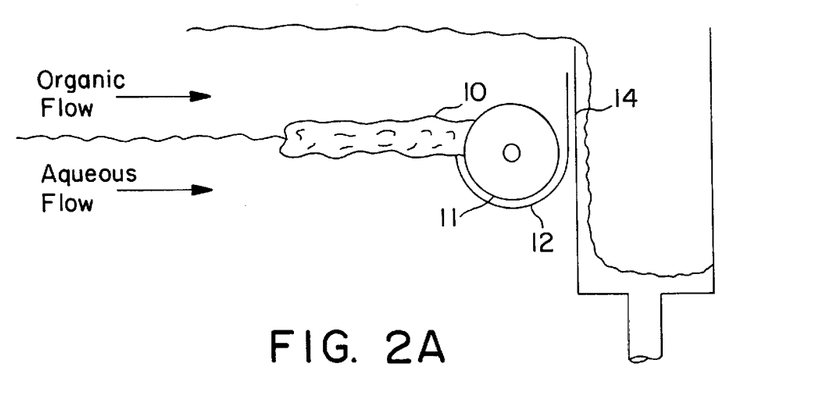
FIG. 2 shows the conveyor screw positioned in various configurations of crud collection troughs.
Figure 2B:
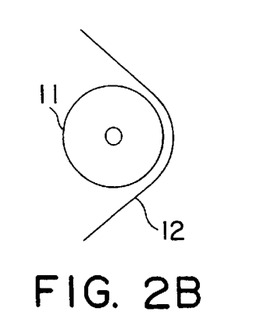
Figure 2C:
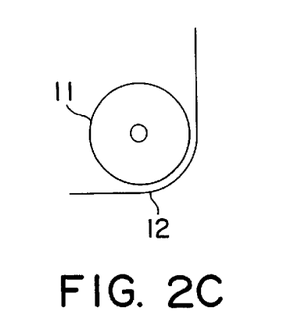
Figure 2D:
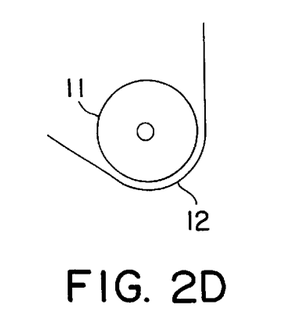

In FIG. 1, side view, the mixer-settler tank 1 is equipped with a mixer blade 2 driven by a motor 3. Pipe 4 entering the bottom of tank I is an inlet pipe for the organic phase. Pipe 5 is an inlet pipe for the aqueous phase. The mixture of organic and aqueous phases flows over overflow weir 6 and through picket fence 7 where the mixture separates into an upper organic phase 8, a lower aqueous phase 9, and an interfacial crud layer 10.

Rotatable conveyor screw 11 is shown positioned in collection trough 12. Conveyor screw 11 when rotated moves the crud into crud collection box 13. However, conveyor screw 11 does not have to be positioned in a collection trough. Conveyor screw 11 can be suspended at the interface by hangers (not shown), where it can turn slowly at the interface by operation of organic overflow weir 14, thus moving the crud across the settler to one corner where it can then be removed. With this configuration, crud collection box 13 would not be needed.

The organic layer 8 flows over organic overflow weir 14 and then through outlet pipe 15. The aqueous layer 9 flows over aqueous overflow weir 16 and then through outlet pipe 17.

In FIG. 1, top view, mixer settler tank 1 contains motor 3 attached to mixer blade 2 (not shown) in mixer section 18, with organic inlet pipe 4 and aqueous inlet pipe 5. In settler section 19, overflow weir 6 and picket fence 7 are shown, with crud layer 10, rotatable conveyor screw 11, collection trough 12, crud collection box 13, organic overflow weir 14, outlet pipe 15, aqueous overflow weir 16, and outlet pipe 17.

Conveyor screw 11 is preferably made of a hard inert plastic, although metal screws such as titanium, stainless steel, or other metals not affected by the organic and aqueous phases can also be used. The spacing of the screw, the size of the shaft, and the diameter of the screw vanes around the shaft are not critical and can be adjusted as required or desired. The conveyor screw is rotated by any convenient variable speed drive system (not shown) such as pneumatic, mechanical chain drive, electric and the like, attached to the end of the conveyor screw opposite to the end closest to the crud collection box.

The drive system can be operated continuously or intermittently, preferably by means of a timer to automatically control the duration and frequency of the operations.

Collection trough 12 is optional but preferred. FIG. 2 shows side views of various possible configurations (options 1–4) of the collection trough 12 shown in FIG. 1. In option 1, collection trough 12 is positioned on or near organic overflow weir 14, with rotatable conveyor screw 11 inside collection trough 12. Crud layer 10 flows into collection trough 12 as shown.

FIG. 2, options 2, 3 and 4 show other configurations that can be used for collection trough 12.

Figure 3A:
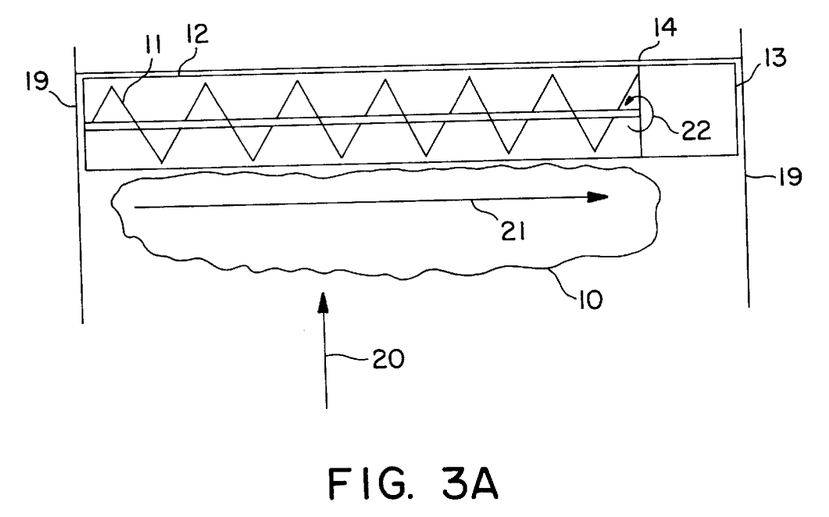
FIG. 3 shows top and end views of a side option configuration for the location of a crud discharge collection box.
Figure 3B:
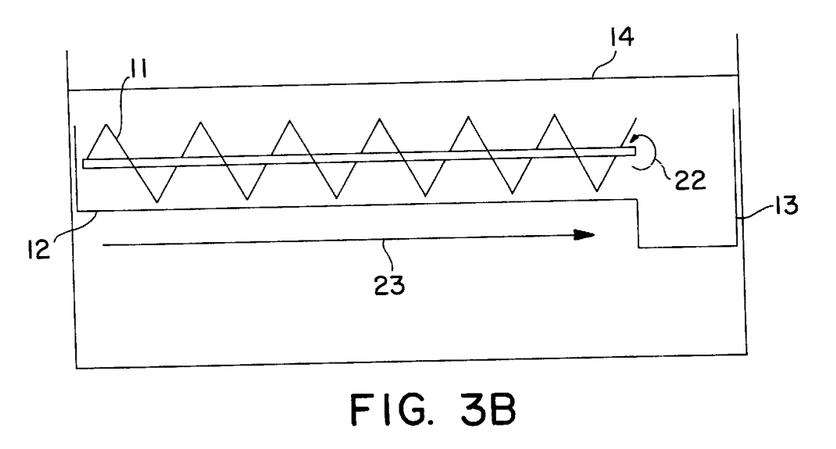

FIG. 3 shows a top view and an end view of the rotatable conveyor screw 11 and crud collection box 13 in which crud collection box 13 is positioned at the side of settler section 19 of the mixer-settler tank.

In the Top View of FIG. 3, conveyor screw 11 is positioned against one wall of settler section 19, and organic overflow weir 14, with crud collection box 13 positioned against the opposite wall of settler section 19. The organic and aqueous layers flow in the direction shown by arrow 20. Crud layer 10 is shown with arrow 21 showing the direction of crud flow inside collection trough 12 when conveyor screw 11 is rotated as shown by arrow 22.

In the End View of FIG. 3, showing conveyor screw 11, collection trough 12, organic overflow weir 14, and crud collection box 13, arrow 23 shows the direction of crud flow in collection trough 12 when conveyor screw 11 is rotated as shown by arrow 22.

Figure 4A:
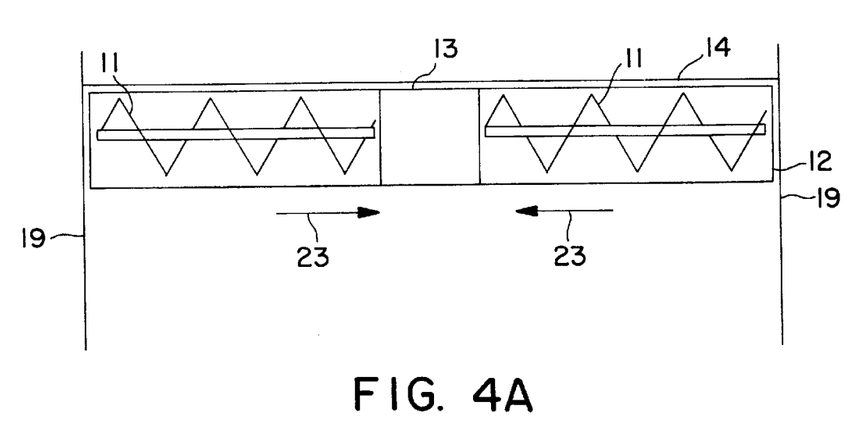
FIG. 4 shows top and end views of a center option configuration for the location of the crud discharge collection box.
Figure 4B:
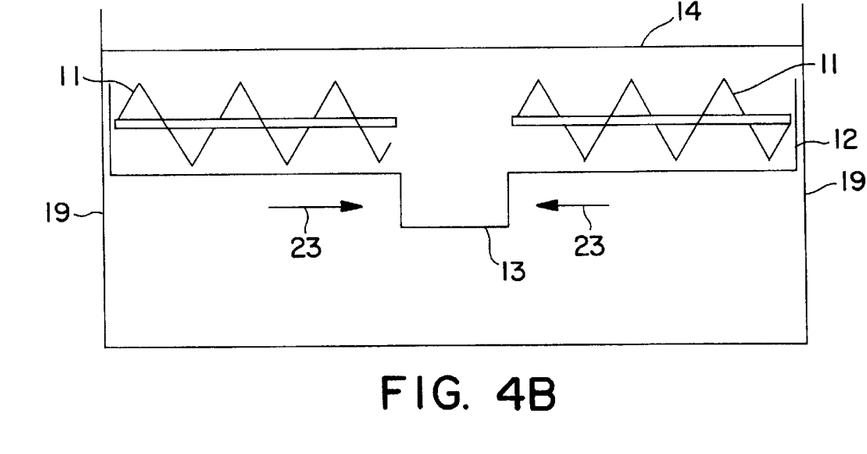

FIG. 4 shows top and end views of a center configuration for the location of crud collection box 13.

In the Top View of FIG. 4, two conveyor screws 11 are present, each attached to a drive mechanism (not shown), in which the drive mechanisms are positioned near opposite walls of settler section 19. Alternatively, a single shaft (not shown) can be employed which is positioned across the settler with clockwise and counter clockwise augers on opposite ends so that the crud is swept to the center.

Crud collection box 13 is positioned in or about the center of settler section 19. Arrows 23 show the directions of crud flow in the sections of collection trough 12.

The End View of FIG. 4 shows organic overflow weir 14, the walls of settler section 19, collection trough 12, conveyor screws 11, crud collection box 13, and arrows 23 showing the directions of crud flow in the sections of collection trough 12.

Figure 5:
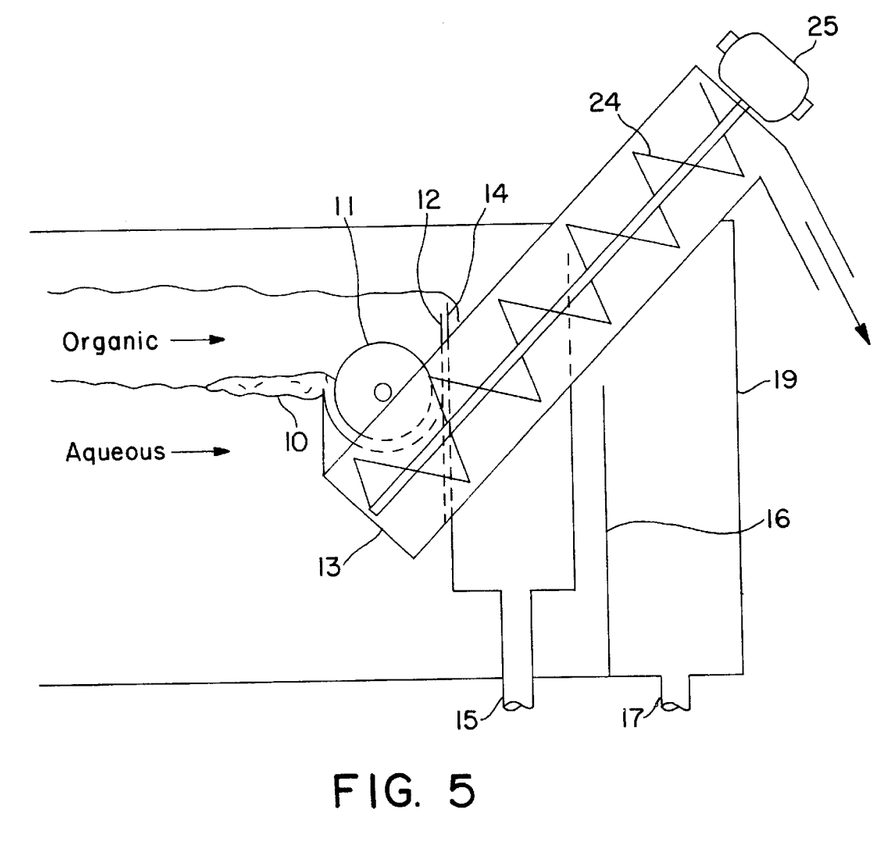
FIG. 5 shows a side view of an auger screw option for lifting and discharging crud from the crud collection box.

FIG. 5 shows a side view of the use of an auger screw to remove and discharge the crud from crud collection box 13.

Crud discharge auger 24 is positioned in crud collection box 13, preferably at an angle, although a vertical auger can also be employed. Crud discharge auger 24 is activated by motor 25. FIG. 5 also shows settler section 19, conveyor screw 11, collection trough 12, organic overflow weir 14, aqueous overflow weir 16, crud layer 10, and outlet pipes 15 and 17.

Figure 6:
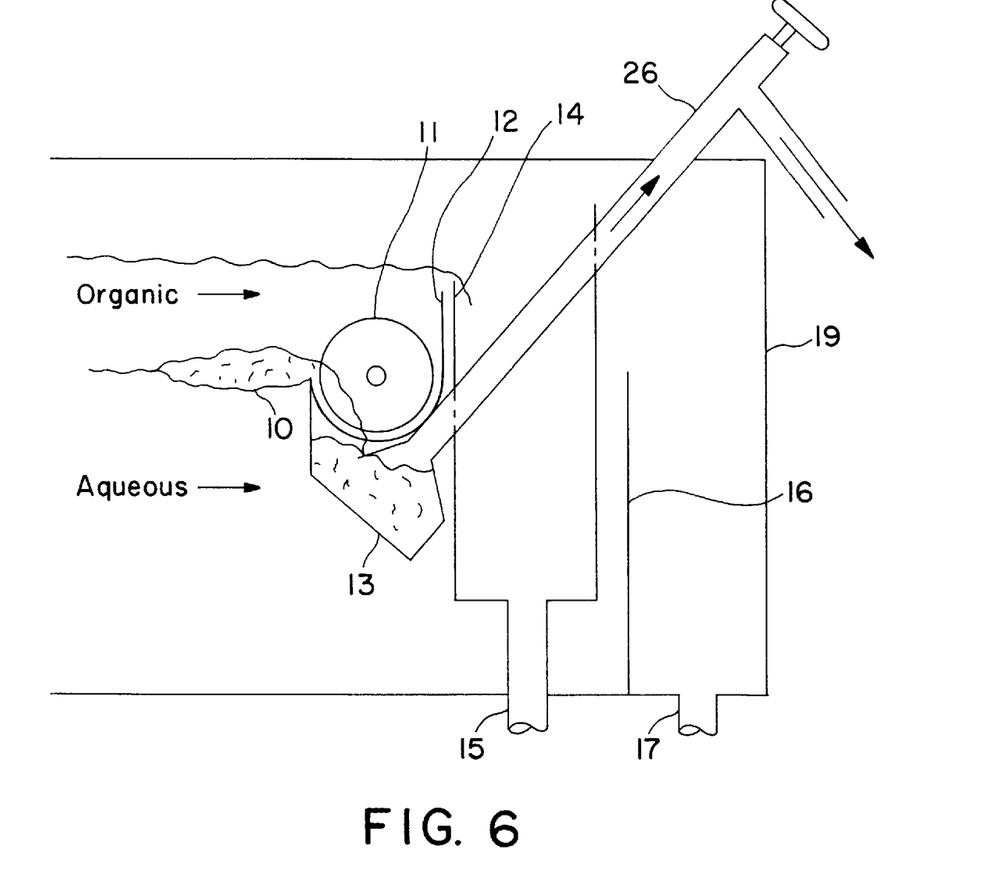
FIG. 6 shows a side view of a pump option for lifting and discharging crud from a crud collection box.

FIG. 6 shows a side view of the use of a crud discharge pump to remove and discharge the crud from the crud collection box 13.

In FIG. 6 crud discharge pump 26 is positioned in crud collection box 13, also preferably at an angle, although vertical placement of the pump can also be employed. FIG. 6 also shows settler section 19, conveyor screw 11, collection trough 12, organic overflow weir 14, aqueous overflow weir 16, crud layer 10, and outlet pipes 15 and 17.

Figure 7:
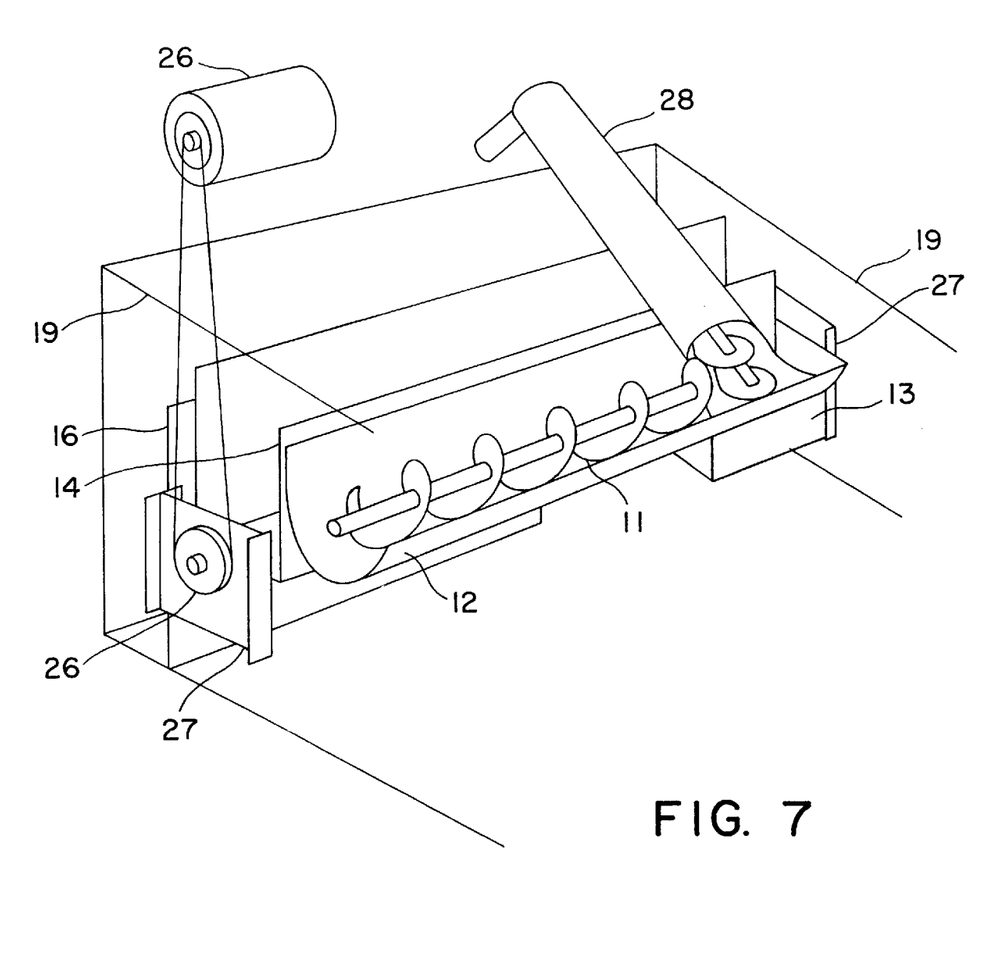
FIG. 7 shows an isometric view of a crud removal system of the invention.

FIG. 7 is an isometric view of the crud removal system of the invention.

In FIG. 7, conveyor screw 11 is positioned in collection trough 12. Collection trough 12 is attached to or positioned near organic overflow weir 14. Conveyor screw 11 is activated by drive means 26. Collection trough 12 is attached to brackets 27 which are mounted on the opposite walls of settler section 19. Crud discharge pump or auger 28 is positioned in crud collection box 13. Also shown is aqueous overflow weir 16.

Figure 8:
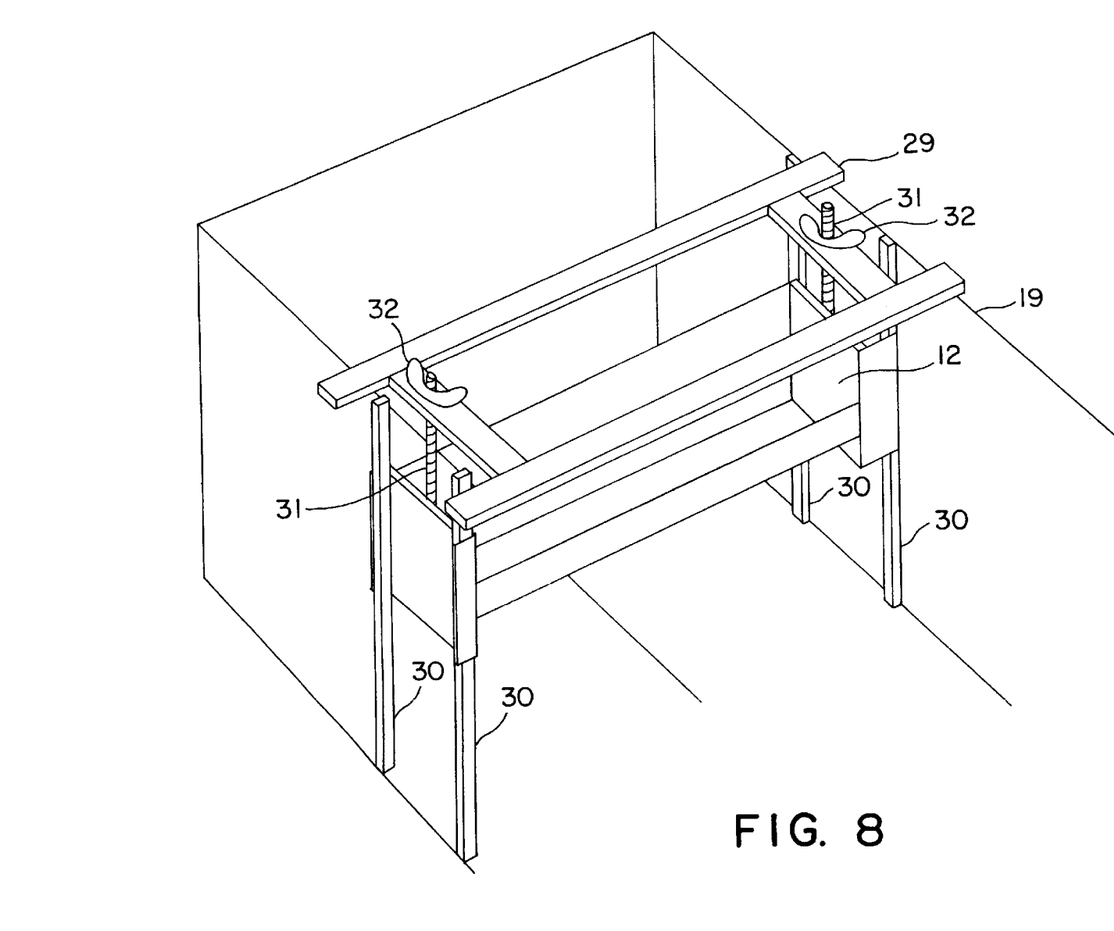
FIG. 8 shows a mechanism for raising and lowering a crud collection trough and conveyor screw for collecting the crud layer.

FIG. 8 shows a mechanism for raising or lowering the crud collection trough and conveyor screw for more efficient collection of the crud layer.

In FIG. 8, frame 29 rests on the top of the walls of settler section 19. Channel guide posts 30 are attached to the walls of settler section 19. Threaded rods 31 are positioned in the frame as shown, to which are attached wing or other adjustable nuts 32. Collection trough 12 can be raised or lowered by adjusting nuts 32. This is in effect a jack screw type mechanism that can be manually or mechanically driven to raise or lower the auger mechanism and position it at the interface.

The crud that is removed by the methods and equipment of the invention can then be processed in conventional ways, such as by the use of a centrifuge, by treatment with clean organic, by the use of chemicals, by the use of a filter press, etc.

The advantages of the present invention include the following:

1. Permits the removal of crud from a solvent extraction mixer-settler on a continuous or intermittent basis with minimum supervision by an operator.
2. The variable speed control for rotating the conveyor screw permits fine-tuning the removal of crud. For example, when crud introduction increases the speed control is increased.
3. The mounting of the crud discharge auger or pump in the crud collection box combined with the adjustable mechanism for raising or lowering the crud collection trough permits positioning of the conveyor screw or screws in the crud layer if and when the crud layer varies in its size and position.
4. Allows the continuous recycle of any aqueous and/or organic solutions that may exit with the crud removed from the system, thereby reducing the need for high circuit organic inventories when the crud is sent to a large crud holding tank. Since a continuous but smaller volume leaves the settler in the present invention, a much smaller holding vessel is needed to separate any organic and/or aqueous solutions that may exit with the crud.
5. Allows for a more stable operation of the solvent extraction circuit since the crud removal can be carried out on a continuous basis, which results in lower unit costs and improved metal quality.

What is claimed is:

1. A process for the removal of crud present at the interface between aqueous and organic layers in an SX settler in a solvent extraction process for the refining of a metal ore comprising the steps of
   A) positioning at least one horizontal rotatable auger inside the settler at or near said interface to move the crud continuously or intermittently to a collection and removal area; and B) removing the crud from the collection and removal area.

2. The process of claim 1 wherein the process is carried out in an SX settler used in the refining of a copper ore, uranium ore, nickel ore, or zinc ore.

3. The process of claim 1 wherein the collection and removal area is a collection box positioned inside the settler.

4. The process of claim 1 wherein step B) is carried out by means of a second rotatable auger or by means of a pump.

5. The process of claim 1 wherein the at least one rotatable auger is activated by drive means attached to one end of the auger.

6. The process of claim 1 wherein the process is carried out with one horizontal rotatable auger.

7. The process of claim 1 wherein the process is carried out with a plurality of rotatable augers.

8. The process of claim 1 wherein step A) of the process is carried out continuously.

9. In an SX settler, the improvement wherein at least one rotatable auger is positioned in the settler to remove crud present at the interface between aqueous and organic phases when the settler is in an operational mode.

10. The SX settler of claim 9 wherein a crud collection box is positioned in the settler to receive the crud when the at least one auger is rotated.

11. The SX settler of claim 9 wherein the at least one rotatable auger is positioned in a collection trough.

12. The SX settler of claim 9 wherein the at least one rotatable auger is composed of hard plastic.

13. The SX settler of claim 10 wherein a second rotatable auger or a pump is positioned in the crud collection box to remove crud from the settler.

14. The SX settler of claim 9 wherein the at least one rotatable auger is attached to drive means.

15. The SX settler of claim 9 wherein a single rotatable auger is present.

16. The SX settler of claim 9 where a plurality of rotable augers are present.

* * * * *